United States Patent [19]

Stephenson

[11] Patent Number: 5,016,672
[45] Date of Patent: May 21, 1991

[54] STEERING CONTROLLER WITH INTEGRAL PARALLEL CONTROL

[75] Inventor: Dwight B. Stephenson, Savage, Minn.

[73] Assignee: Eaton Corporation, Cleveland, Ohio

[21] Appl. No.: 513,366

[22] Filed: Apr. 23, 1990

[51] Int. Cl.$^5$ .............................................. F15B 13/04
[52] U.S. Cl. ................................ 137/625.24; 60/384; 91/32; 91/467; 137/596
[58] Field of Search ...................... 60/384; 91/32, 467; 137/596, 625.24

[56] References Cited

U.S. PATENT DOCUMENTS

| | | |
|---|---|---|
| Re. 25,126 | 2/1962 | Charlson . |
| 2,833,253 | 5/1958 | Wittren . |
| 3,385,057 | 5/1968 | Pruvot et al. . |
| 3,584,538 | 6/1971 | Petersen ............................... 91/421 |
| 3,937,601 | 2/1976 | Miller ................................... 418/61 |
| 4,033,377 | 7/1977 | Johnson .............................. 137/596 |
| 4,237,773 | 12/1980 | Liebert et al. ........................ 91/467 |
| 4,838,375 | 6/1989 | Nagai ................................... 180/142 |

Primary Examiner—Gerald A. Michalsky
Attorney, Agent, or Firm—L. J. Kasper

[57] ABSTRACT

A fluid controller (11) is provided of the type including a primary, rotatable spool valve (35) and a relatively rotatable follow-up sleeve valve (37). The spool and sleeve define a main fluid path in response to relative rotation, the main fluid path including flow through a fluid meter (17). In accordance with the invention, the spool and sleeve are also moveable axailly relative to each other to define a separate fluid path, in parallel with the main fluid path, the parallel fluid path preferrably excluding the fluid meter (17). Axial actuation of the spool and sleeve relative to each other may be accomplished by controlling fluid pressure in a pair of axial fluid chambers (69, 83). The control of the fluid pressure may be accomplished by any suitable electrohydraulic means (95) or hydromechanical means (181).

36 Claims, 10 Drawing Sheets

STEERING CONTROLLER WITH INTEGRAL PARALLEL CONTROL

BACKGROUND OF THE DISCLOSURE

The present invention relates to fluid controllers of the type used to control the flow of fluid from a source of pressurized fluid to a fluid pressure actuated device such as a steering cylinder which comprises part of a full-fluid-linked vehicle steering system.

Although the present invention may be used in connection with fluid controllers of many types, and having various applications, it is especially advantageous when used with a fluid controller of the type used in full-fluid-linked steering systems, and will be described in connection therewith.

A typical fluid controller of the type to which the present invention relates includes a housing which defines various fluid ports, and further includes a fluid meter, a valve means, and an arrangement for imparting follow-up movement to the valve means, in response to the flow of fluid through the fluid meter. The flow through the controller valve means is directly proportional to the area of the variable flow control orifices in the main fluid path, the area of the flow control orifices in turn being proportional to the rate at which the steering wheel is rotated.

A typical example of a vehicle which utilizes a fluid controller of this type would be an agricultural tractor or combine. There is growing interest in being able to steer such vehicles by some means other than the conventional rotary input of the steering wheel by the operator. For example, in vehicles designed for harvesting crops, there is a desire to be able to steer the vehicle by sensing the crop (e.g., rows of corn), and adjust the position of the steering cylinder accordingly so that the vehicle follows the crop rows.

Prior to the present invention, in order to provide a vehicle with both conventional rotary input, full-fluid-linked steering, and automated guidance, would have required that the vehicle be equipped with both a conventional fluid controller and a separate, parallel control system, operable in response to an electrical signal generated by the crop sensors. Such steering systems have not been commercially acceptable, primarily because of the cost associated with providing two separate, independent steering devices. However, another disadvantage of such a system is the difficulty and complexity of coordinating the two different devices. For example, if the automated guidance device is operating, and the vehicle operator realizes that for safety reasons it is necessary to deviate from the automated path, the conventional rotary input controller must be connected to the automated guidance device in such a manner that the controller is able to override the automated guidance device. Although such systems have been proposed, the overall expense and complexity has prevented commercial acceptability.

SUMMARY OF THE INVENTION

Accordingly, it is an object of the present invention to provide an improved steering control system including both a conventional rotary input controller and a parallel control capability, and which is simpler, less expensive, and requires substantially less plumbing than the prior art systems which have been proposed.

It is a more specific object of the present invention to provide an improved fluid control system which achieves the above-stated object by providing the parallel fluid path within the fluid controller.

It is another object of the present invention to provide an improved fluid controller of the spool-sleeve valve type which is operable to control fluid flow in response to either conventional rotary input to the spool-sleeve valving, or in response to some other form of control input.

It is still another object of the present invention to provide an improved fluid controller which is operable to define a main fluid path, including the fluid meter, in response to the conventional rotary input, or to define a parallel fluid path which excludes the fluid meter.

It is a related object of the present invention to provide an improved fluid controller of the spool-sleeve type having an improved valving architecture which makes it possible to define a parallel fluid path which excludes the fluid meter, while at the same time, defining a main fluid path which includes the fluid meter to facilitate emergency manual steering.

The above and other objects of the present invention are accomplished by the provision of an improved fluid controller operable to control the flow of fluid from a source of pressurized fluid to a fluid pressure operated device. The controller is of the type including a housing defining an inlet port for connection to the source of pressurized fluid, a return port for connection to a reservoir, and first and second control fluid ports for connection to the fluid pressure operator device. Valve means is disposed in the housing and comprises a primary, rotatable valve member and a cooperating, relatively rotatable follow-up valve member, the valve members defining a neutral rotary position and a first rotary operating position in which the primary valve member is rotatably displaced from the neutral rotary position, relative to the follow-up valve member. The primary valve member defines first and second fluid passages, and the follow-up valve member defines a first fluid port in continuous fluid communication with the inlet port and a second fluid port in continuous fluid communication with the first control fluid port. The first and second fluid ports are blocked from fluid communication with the first and second fluid passages, respectively when the valve members are in the neutral rotary position. The first fluid port is in communication with the first fluid passage to define a first variable flow control orifice and the second fluid port is in communication with the second fluid passage, to define a second variable flow control orifice, when the valve members are in the first rotary operating position. The housing means and the valve members cooperate to define a first main fluid path providing communication between the first and second variable flow control orifices.

The improved controller is characterized by the primary and follow-up valve members defining a neutral axial position and a first axial operating position. The controller includes means operable to bias the valve members toward the neutral axial position and means operable to displace the valve members to the first axial operating position. The primary valve member defines first and second axial fluid passages and the follow-up valve member defines a first axial fluid port in continuous communication with the inlet port, and a second axial fluid port in continuous communication with the first control fluid port. The first axial fluid port is blocked from fluid communication with the first axial fluid passage, and the second axial fluid port is blocked from communication with the second axial fluid passage, when the valve members are in the neutral axial position. The first axial fluid port is in communication with the first axial fluid passage to define a first variable axial flow control orifice, and the second axial fluid port is in communication with the second axial fluid passage to define a second variable axial flow control orifice when the valve members are in the first axial operating position. The valve members cooperate to define a first parallel fluid path providing fluid communication between the first and second variable axial flow control orifices when the valve members are in the first axial operating position.

In accordance with another aspect of the present invention, the fluid controller includes a fluid actuated means for imparting follow-up movement to the follow-up valve member proportional to the volume of fluid flow through the first main fluid path when the valve members are in the first rotary operating position. When the valve members are in the first axial operating position, the first parallel fluid path excludes the fluid actuated means.

DESCRIPTION OF THE PREFERRED EMBODIMENT

Figure 1:
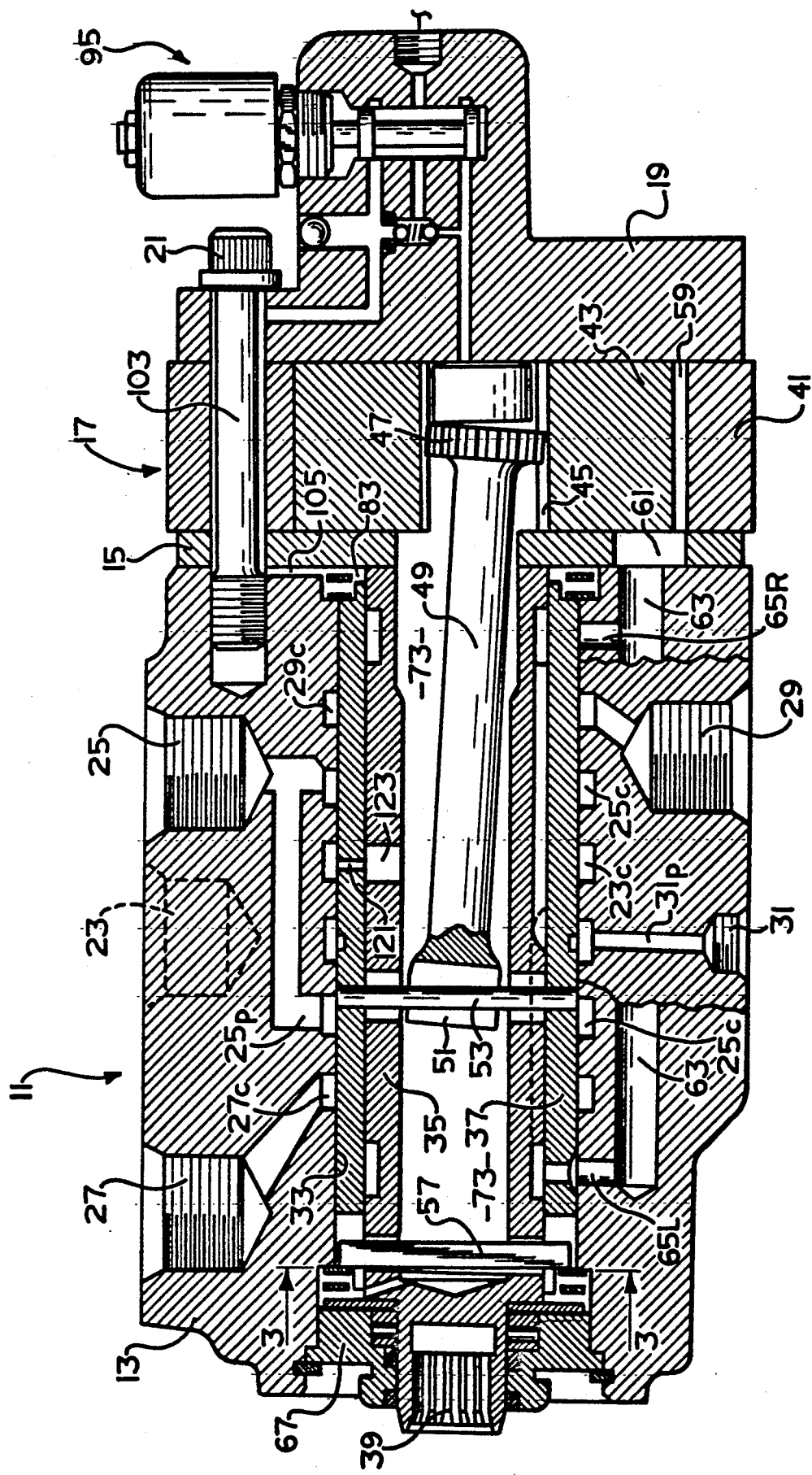
FIG. 1 is an axial cross-section of a fluid controller made in accordance with the present invention.

Referring now to the drawings, which are not intended to limit the invention, FIG. 1 illustrates a fluid controller, generally designated 11, made in accordance with the teachings of the present invention. The fluid controller 11 may be of the general type illustrated and described in U.S. Pat. No. RE 25,126, and in the subject embodiment, is more specifically of the type illustrated and described in U.S. Pat. No. 4,033,377, both of which are assigned to the assignee of the present invention and incorporated herein by reference.

Referring still to FIG. 1, the fluid controller 11 comprises several sections, including a valve housing 13, a port plate 15, a section comprising a fluid meter 17, and an end cap 19. These sections are held together in tight sealing engagement by means of a plurality of bolts 21, which are in threaded engagement with the valve housing 13.

The valve housing 13 defines a fluid inlet port 23 (shown in solid lines only in FIG. 2), a fluid return port 25, and a pair of control (cylinder) fluid ports 27 and 29. The valve housing 13 also defines a load signal port 31. As is well-known to those skilled in the art, the inlet port 23 would be connected in fluid communication with a source of pressurized fluid such as a hydraulic pump (not shown) while the return port 25 would be in fluid communication with a system reservoir (shown only in FIG. 6). The control ports 27 and 29 would be connected to the opposite ends of a steering cylinder (not shown), while the load signal port 31 would be connected to a fluid pressure responsive device for varying the delivery of fluid to the controller 11, in the manner illustrated and described in U.S. Pat. No. 4,620,416, also assigned to the assignee of the present invention, and incorporated herein by reference.

The valve housing 13 defines a valve bore 33, and rotatably disposed therein is a valving arrangement, comprising a primary, rotatable valve member 35 (referred to hereinafter as the "spool"), and a cooperating, relatively rotatable follow-up valve member 37 (referred to hereinafter as the "sleeve"). At the forward end of the spool 35 is a portion having a reduced diameter, and defining a set of internal splines 39 which provide for a direct mechanical connection between the spool 35 and a steering wheel (not shown). The spool 35 and sleeve 37 will be described in greater detail subsequently.

The fluid meter 17 may be of the type well-known in the art, and in the subject embodiment, includes an internally-toothed ring member 41, and an externally-toothed star member 43, which is eccentrically disposed within the ring 41, for orbital and rotational movement relative thereto. The star 43 defines a set of internal spines 45, and in splined engagement therewith is a set of external splines 47 formed at the rearward end of a drive shaft 49. The drive shaft 49 has a bifurcated forward end 51 permitting driving connection between the shaft 49 and the sleeve 37, by means of a drive pin 53. The ends of the pin 53 pass through a pair of oversized pin openings 55 defined by the spool 35, and are received in relatively close fitting openings in the sleeve 37. The configuration of the pin openings 55 will be described in greater detail in connection with the spool-sleeve layouts of FIGS. 7 through 11. As is well-known to those skilled in the art, pressurized fluid flowing from the inlet port 23 through the various passages defined by the spool 35 and sleeve 37 then flows through the fluid meter 17, causing orbital and rotational movement of the star 43 within the ring 41. Such movement of the star 43 causes rotational follow-up movement of the sleeve 37, by means of the drive shaft 49 and drive pin 53, to maintain a particular relative rotational displacement (referred to hereinafter as a "rotary operating position") between the spool 35 and sleeve 37, proportional to the rate of rotation of the steering wheel. A plurality of leaf springs 57 extend through openings in the spool 35, biasing the sleeve 37 toward the rotary neutral position (as that term will be defined in connection with FIG. 7), relative to the sleeve 35.

Figure 2:
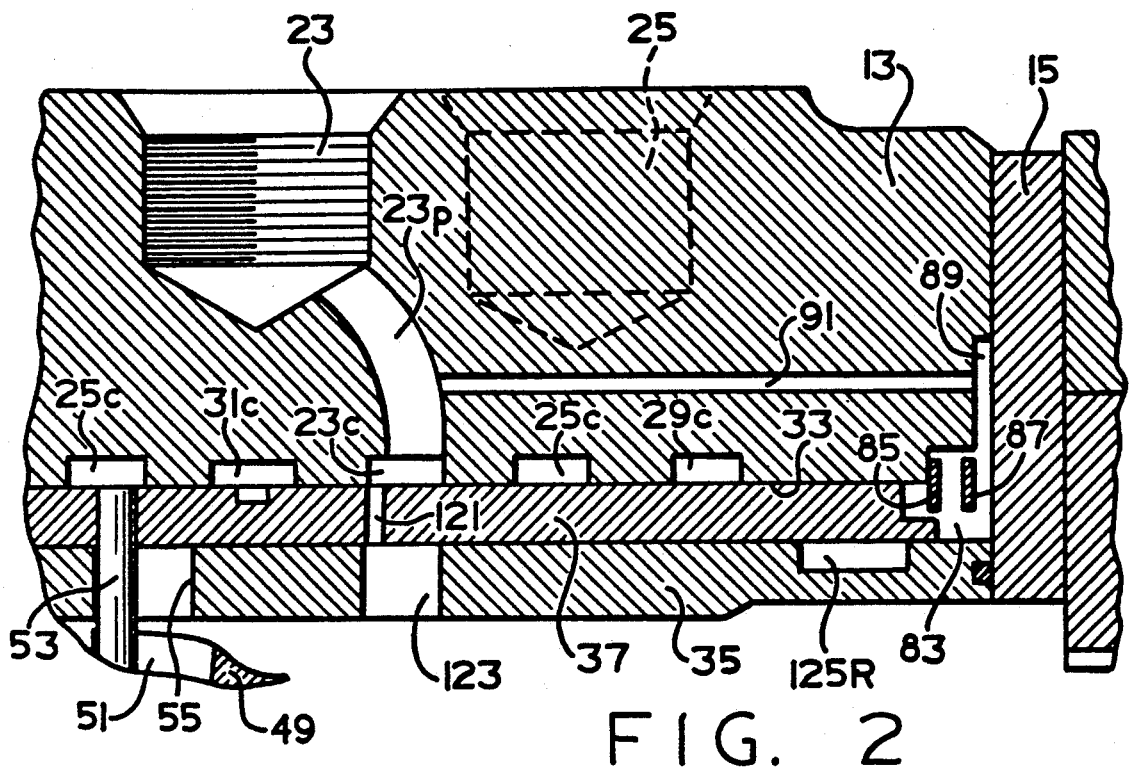
FIG. 2 is an enlarged, axial cross-section, similar to FIG. 1, but on a different plane, and showing the sleeve valve axially displaced from its neutral axial position.

Referring now to FIG. 1, in conjunction with FIG. 2, the valve bore 33 of the valve housing 13 defines a plurality of annular fluid chambers surrounding the sleeve 37, to provide fluid communication between the various ports and the outer surface of the sleeve 37. An annular chamber 23c receives pressurized fluid from the inlet port 23, while a pair of annular chambers 25c, which are interconnected by a fluid passage 25p, communicate return fluid to the return port 25. In addition, an annular chamber 27c provides communication to or from the control port 27, while an annular chamber 29c provides communication to or from the control port 29. Finally, an annular chamber 31c provides communication with the load signal port 31, by means of a fluid passage 31p.

The toothed interaction of the star 43, orbiting and rotating within the ring 41, defines a plurality of expanding and contracting fluid volume chambers 59, and adjacent each such chamber 59, the port plate 15 defines a fluid port 61. The valve housing 13 defines a plurality of axial bores 63 (only one of which is shown in FIG. 1), each of which is in open communication with one of the fluid ports 61. The valve housing 13 further defines a pair of radial bores 65L and 65R, providing communication between each of the axial bores 63 and the valve bore 33, as will be described in greater detail subsequently.

It is believed that the normal rotary actuation of a controller of the general type shown in FIG. 1 is now well-known to those skilled in the art, and such operation will be described only briefly herein. As the steering wheel is rotated, for example, in the clockwise direction, the spool 35 also is rotated clockwise, as viewed by the vehicle operator, opening up a series of variable flow control orifices between the spool 35 and sleeve 37. These orifices permit fluid communication from the inlet port 23 through several of the orifices in series, and then through the radial bores 65R and the axial bores 63 to the expanding volume chambers 59 of the fluid meter 17. Fluid flowing from the contracting fluid volume chambers 59 of the meter 17 flows through other of the axial bores 63, then into the radial bores 65L, then through another variable orifice in the valving, and out to the cylinder port 27. Fluid returning from the steering cylinder enters the cylinder port 29, then flows through another series variable orifice in the valving, and then out to the return port 25. The above-described fluid path is typically referred to as the "main fluid path", and the use of that term hereinafter will be understood to mean the above-described fluid path when the spool and sleeve are in a rotary operating position.

It should be noted that all of the elements described up to this point are elements which are already known, and have been illustrated and described in the above-incorporated U.S. patents. The newly added elements which comprise the various aspects of the present invention will now be described. In conventional controllers of the spool-sleeve type (such as in the above-incorporated patents), the area of flow orifices in the valving is changed in response only to relative rotation between the spool and sleeve. Thus, in such controllers, it has been typical for the axial length of the sleeve to be the same as that of the spool (excluding the reduced diameter portion).

It is one important aspect of the present invention to be able to define flow orifices in the valving in response to both relative rotary motion of the spool and sleeve, and relative axial motion of the spool and sleeve. In the subject embodiment, by way of example and not limitation, such relative axial motion is accomplished by making the sleeve 37 axially shorter than the adjacent portion of the spool 35, and providing means for axially displacing the sleeve 37, relative to the spool 35, from a neutral axial position to an axial operating position.

Figure 4:
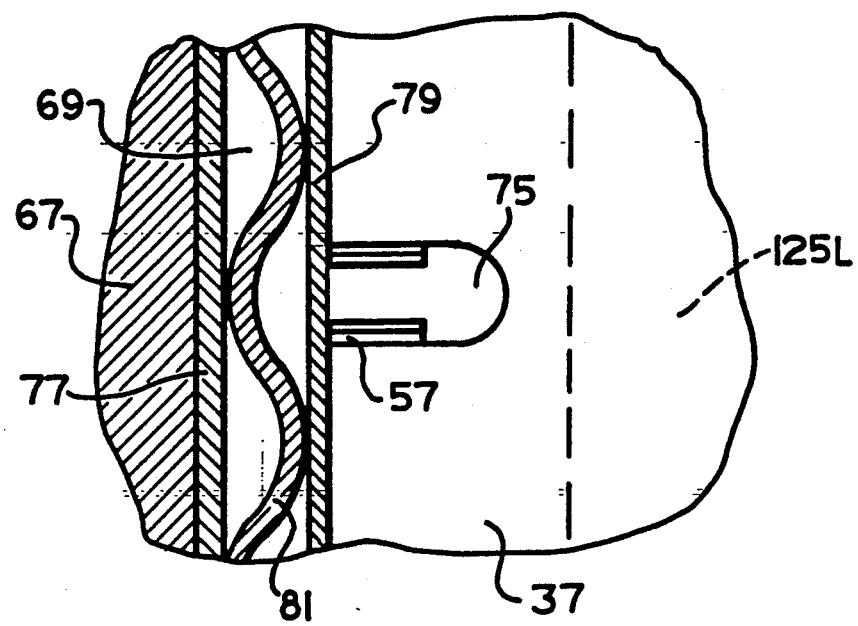
FIG. 4 is an enlarged, axial layout view, taken on line 4—4 of FIG. 3.
Figure 5:
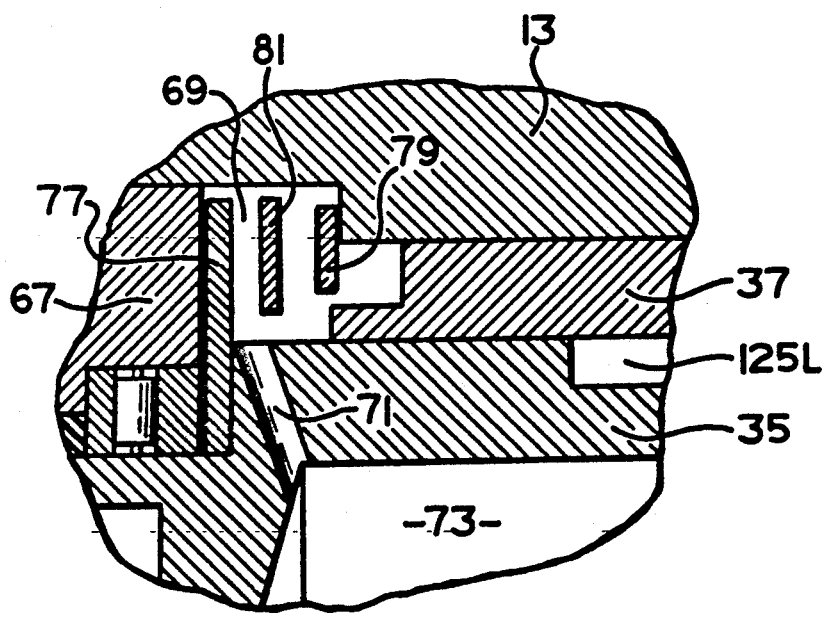
FIG. 5 is an enlarged, fragmentary, axial cross-section like FIG. 1, but taken on a different plane, illustrating the forward spring chamber.

Referring now primarily to FIGS. 4 and 5, in conjunction with FIG. 1, disposed radially between the housing 13 and the reduced diameter portion of the spool 35 is a seal gland bushing 67 (see also FIG. 1) which cooperates with the housing 13, the spool 35, and the sleeve 37 to define a forward pressure chamber 69. The chamber 69 receives pressurized fluid through an angled passage 71 (see FIG. 5) defined by the spool 35, from an interior chamber 73 defined primarily by the spool 35. The manner of controlling the fluid pressure in the chamber 73 and therefore in the chamber 69 will be described subsequently. Unlike most conventional controllers of the spool-sleeve type, the interior chamber 73 in the present invention is isolated from the return port 25, such that there may be another fluid pressure actuated device connected downstream of the controller, resulting in a high back pressure in the return port 25.

Figure 3:
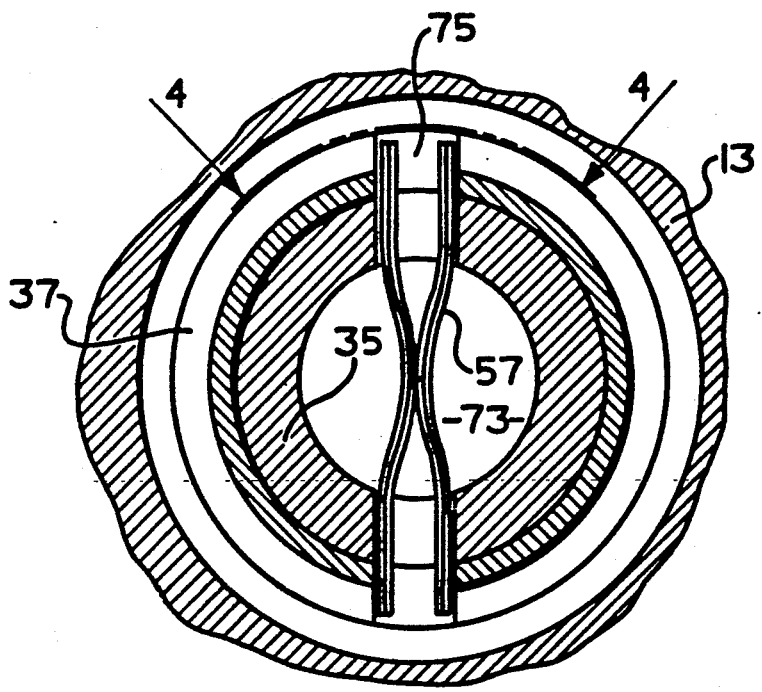
FIG. 3 is an enlarged, transverse cross-section, taken on line 3—3 of FIG. 1, showing the springs which bias the spool and sleeve toward their neutral rotary position.

Referring now primarily to FIGS. 3 through 5, the sleeve 37 defines a pair (only one of which is shown in FIG. 4) of diametrically disposed, generally U-shaped openings 75 in which the outer ends of the springs 57 are seated. Disposed adjacent the seal gland bushing 67 is an annular washer 77, and disposed on the other side of the chamber 69 is an annular washer 79. Seated between the washers 77 and 79 is a wave spring 81 which comprises an axial centering spring, operable to bias the sleeve 37 toward its neutral axial position shown in FIG. 1. It should be noted that the axial position of the sleeve 37 as shown in FIG. 5 is not the neutral axial position, but is a position resulting from the forward chamber 69 being pressurized, and corresponds generally to the axial operating position illustrated in FIG. 9, which will be described subsequently.

Referring again to FIG. 2, the housing 13, the port plate 15, the spool 35, and the sleeve 37 cooperate to define a rearward pressure chamber 83 which, when pressurized, biases the sleeve 37 to the position shown in FIG. 2, corresponding generally to the axial operating position illustrated in FIG. 11, which will be described subsequently. An annular washer 85 is seated against a shoulder defined by the housing 13, and seated between the washer 85 and the port plate 15 is a wave spring 87 which comprises an axial centering spring, and is preferably of the same size, construction, and spring rate as the wave spring 81 shown in FIG. 4. It should be understood by those skilled in the art that with the sleeve 37 biased to the position shown in FIG. 5, the wave spring 87 is compressed and is biasing the sleeve toward its neutral axial position in opposition to the biasing force of the fluid pressure in the chamber 69, whereas, when the sleeve is in the position shown in FIG. 2, the wave spring 81 is being compressed and is biasing the sleeve toward its neutral axial position in opposition to the biasing force of the fluid pressure in the chamber 83.

Referring still to FIG. 2, in conjunction with FIG. 1, the inlet port 23 communicates with the annular chamber 23c by means of a fluid passage 23p. The rearward chamber 83 includes a radially outward chamber portion 89 which is in fluid communication with the inlet port 23 by means of the passage 23p and a restricted axial passage 91.

Figure 6:
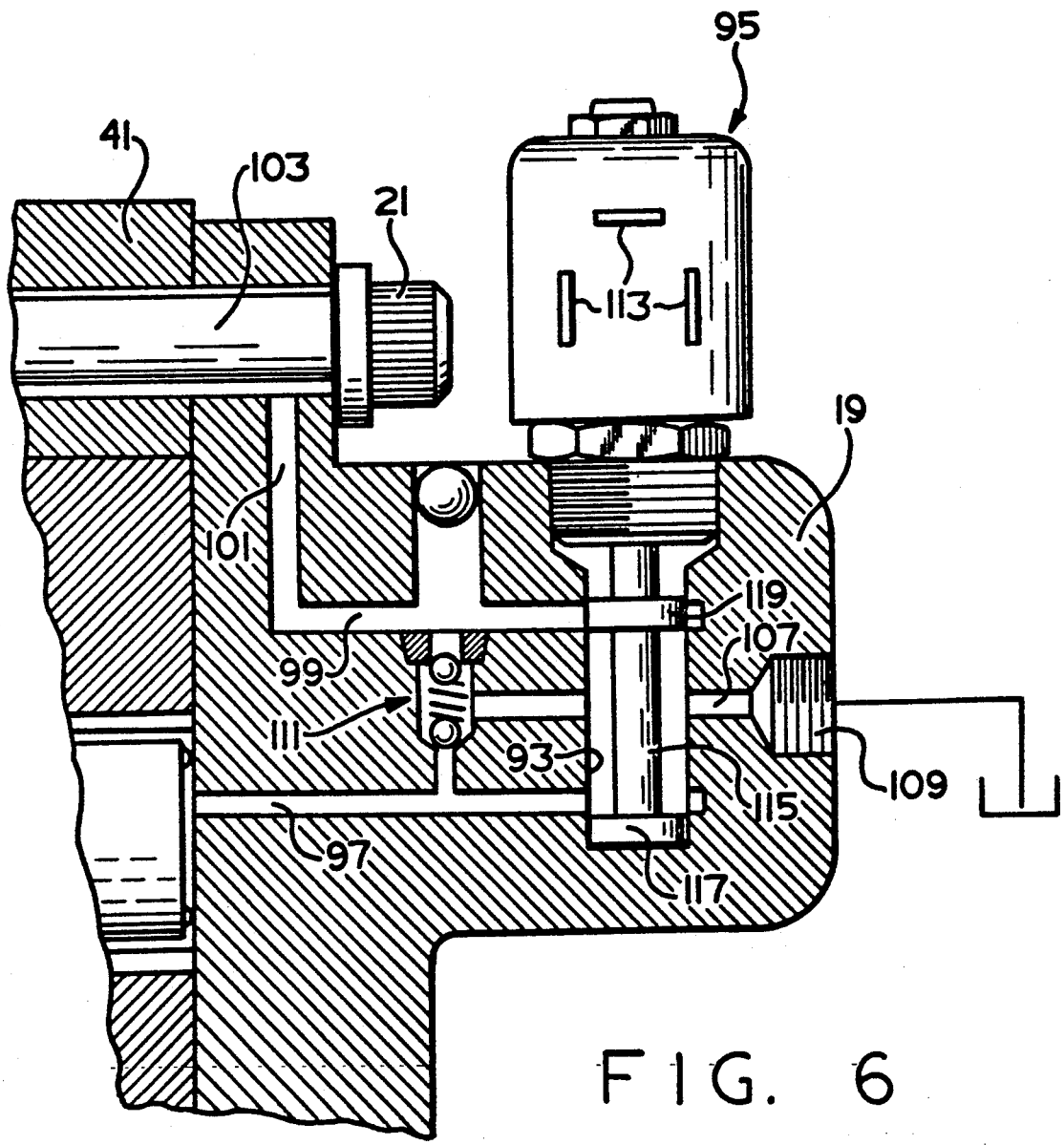
FIG. 6 is an enlarged, axial cross-section, like FIG. 1, of the electrohydraulic valve portion of the controller, but in an actuated position.

Referring now primarily to FIGS. 1 and 6, the electrohydraulic control circuit for effecting axial actuation of the sleeve 37 will be described. The end cap 19 defines a stepped bore 93, adapted to receive an electromagnetic solenoid valve, generally designated 95. The end cap 19 defines three different axial fluid passages, each of which intersects the stepped bore 93. An axial passage 97 intersects the lower end of the bore 93, and is in open fluid communication with the interior chamber 73, defined primarily by the spool 35, but also defined partly by the star 43. An axial passage 99 intersects the upper end of the stepped bore 93, and also includes a radial passage portion 101 which is in open communication with a reduced diameter shank portion 103 of one of the bolts 21. As may be seen only in FIG. 1, the rearward pressure chamber 83 includes a radially outward chamber portion 105 which is in open communication with the space surrounding the shank portion 103.

Disposed between the axial passages 99 and 97 is an axial passage 107 which intersects the bore 93 and terminates at a port 109 which is illustrated in FIG. 6 as being in communication with the system reservoir. Within the scope of the invention, the port 109 could be connected to some other source of relatively low pressure fluid, or could even be connected to a source of relatively higher pressure fluid, thus eliminating the need to tap pressurized pilot fluid from the inlet port 23, as shown in FIG. 2. The left end (in FIG. 6) of the axial passage 107 is in communication with a relief valve assembly 111, the function of which is to relieve any excess pressure from either of the axial passages 97 or 99 to the passage 107, then to the port 109. If the port 109 is connected to relatively higher fluid pressure, the passages 91 and 121 would both be connected, through a restriction, to passage 25p, and the fluid return port would be connected to a source of low pressure, such as the system reservoir. In addition, the relief valve assembly 111 would be vented by passage 107, not to the port 109, but instead, to a low pressure source. By "excess" is meant any pressure greater than that needed or desired in the chambers 69 and 83, to actuate the sleeve 37. As is understood by those skilled in the art, if the pilot pressure in the interior chamber 73 is is more than about 100 or 200 psi., the result will be an excessive force biasing the spool 35 forwardly (to the left in FIG. 5), which may cause binding of the spool against the washer 77, interfering with proper steering action.

The solenoid valve 95 includes a set of electrical contacts 113, adapted to receive an external electrical signal (to be referred to hereinafter as signal 113) from a control source, such as a microprocessor. The solenoid valve 95 further includes a valve member, generally designated 115, including a pair of spool lands 117 and 119, and being movable from a neutral, centered position (FIG. 1) to either an upward actuated position (not shown), or a downward actuated position (FIG. 6). Within the scope of the present invention, the solenoid valve 95 could be of the ON-OFF type, and pulse-width-modulated between the centered position and the desired actuated position, or could be proportional between the two extreme actuated positions. Various other electrohydraulic control arrangements could be utilized, all of which are within the scope of the invention, as long as they perform the function set forth in the appended claims.

Referring again to FIG. 2, in conjunction with FIG. 1, pressurized pilot fluid is communicated from the inlet port 23 into the interior chamber 73 by means of a pilot passage 121 defined by the sleeve 37, and an enlarged pilot opening 123, defined by the spool 35. When the sleeve 37 is in the neutral rotary and neutral axial position shown in FIGS. 1 and 7, the pilot passage 121 is approximately centered relative to the pilot opening 123 (see FIG. 7), as is the drive pin 53 within the pin openings 55. However, when the sleeve 37 is shifted axially to the position shown in FIGS. 2 and 11, the pilot passage 121 is shifted over to one side of the pilot opening 123, but as is shown in FIGS. 2 and 11, it is still in a position to permit communication from the inlet port 23 to the interior chamber 73.

Axial Actuation of Sleeve 37

Figure 7:
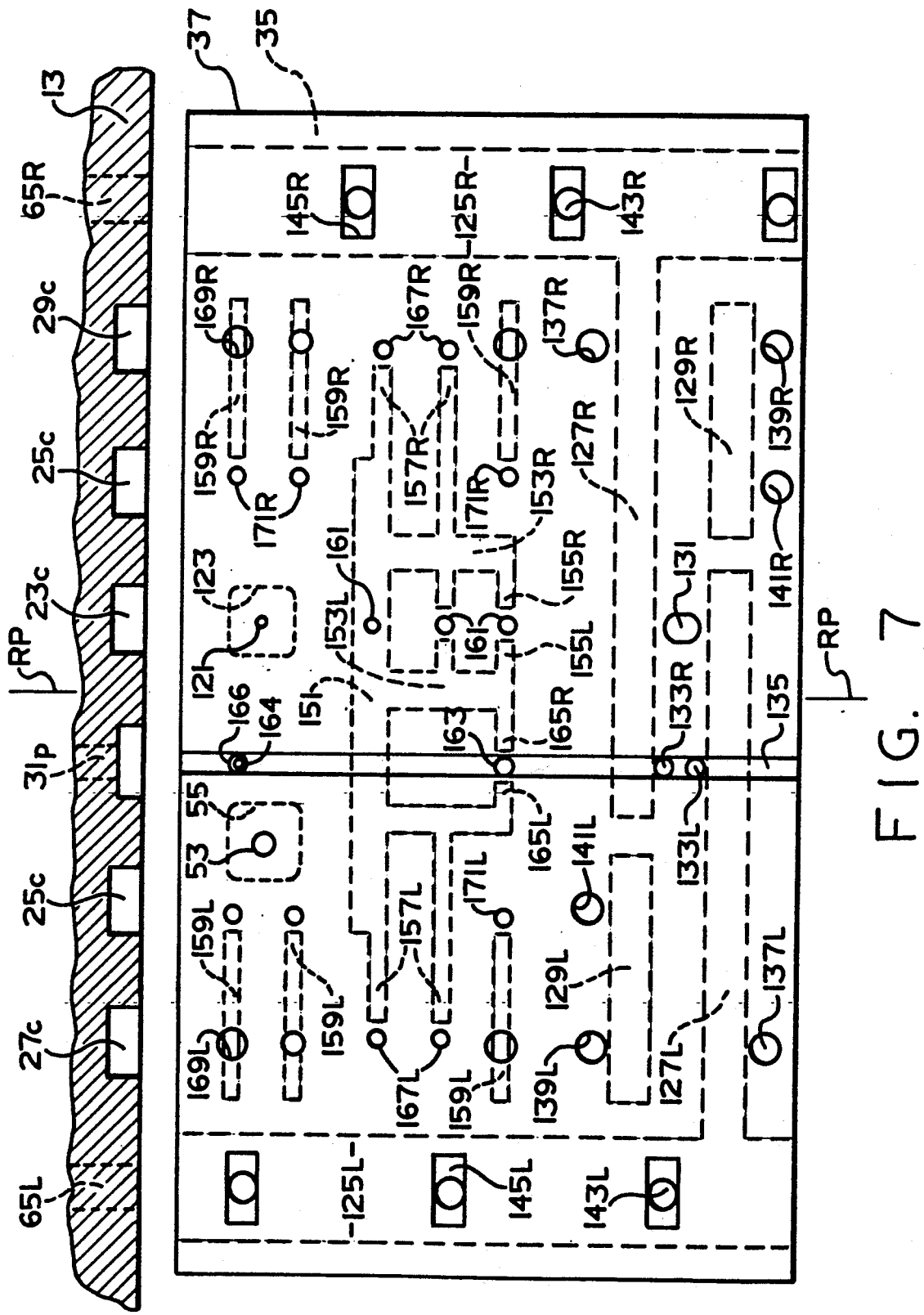
FIG. 7 is an overlay view of the valving used in the fluid controller of FIG. 1, but on a larger scale than in FIG. 1, and with the valving in both the neutral rotary and neutral axial position.

With the solenoid valve 95 in a neutral or unactuated condition, as shown in FIG. 1, the spool land 117 permits fluid communication from the axial passage 97 to the port 109, while the spool land 119 permits fluid communication from the axial passage 99 to the port 109. In this condition, there is no substantial buildup of pilot pressure in the interior chamber 73 and forward pressure chamber 69, or in the rearward pressure chamber 83. As a result, the biasing force of the axial centering springs 81 and 87 is sufficient to bias the sleeve 37 to its neutral axial position as shown in FIGS. 1 and 7.

Referring now to FIG. 6, if the solenoid valve 95 receives an appropriate electrical signal 113 at the contacts, the valve member 115 is shifted downward to the position shown in FIG. 6 in which the spool land 117 permits unrestricted communication between the axial passage 97 and the port 109. However, the spool land 119 is now in a position blocking communication from the axial passage 99 to the port 109, resulting in a buildup of pressure in the radial passage portion 101, the region surrounding the shank portion 103, the chamber portion 105, and the rearward pressure chamber 83. The buildup of pressure in the chamber 83 is a result of pressure being communicated from the inlet port 23 through the passage 91 and chamber portion 89 into the rearward chamber 83. As pressure in the chamber 83 builds, the sleeve 37 is biased to the left, to the position shown in FIGS. 2 and 11, in opposition to the biasing force of the spring 81 in the forward chamber 69. Similarly, if the valve member 115 is moved upward from its neutral position, such that the spool land 117 blocks communication from the passage 97 to the port 109, pilot pressure would build in the interior chamber 73 and forward chamber 69, fed by pilot flow through the pilot passage 121 and pilot opening 123, thus shifting the sleeve 37 to the right, to the position shown in FIGS. 5 and 9, in opposition to the biasing force of the spring 87 in the rearward chamber 83.

Although the present invention has been described in connection with a particular, preferred embodiment, with regard to the axial actuation of the sleeve 37, it should be understood that the pilot pressure arrangement and electrohydraulic controls illustrated and described herein are merely one example, and that various other pilot arrangements could be utilized. For example, the pilot flow to the forward chamber 69 could be through the housing 13, while the communication between the rearward chamber 83 and the solenoid valve 95 could be through the spool 35 and the interior chamber 73. Furthermore, the solenoid valve 95 could be located in the housing 13, which would result in a substantially different arrangement of the various pilot passages. As one further example, although pilot pressure is taken from the inlet port 23 in the subject embodiment, pilot pressure could also be taken from a "regulated" return port 25, i.e., a return port which is maintained at a predetermined pressure, such as 100 psi. Within the scope of the present invention, all that is essential is that there be some means included which is operable to bias the spool and sleeve toward their neutral axial position, and that there be some means included which is operable to displace the spool and sleeve to one or more axial operating positions.

Parallel Fluid Path

The invention provides the ability to actuate the valve members axially relative to each other, in addition to the normal rotary actuation. It is another important aspect of the present invention that the valve members be laid out such that axial actuation thereof results in a flow path being defined within the controller which is preferably separate and distinct from the main fluid path, normally defined in response to relative rotation of the valve members. More specifically, when the valve members are axially actuated, the resulting fluid path should be a path which is in parallel with the main fluid path, i.e., it also communicates from the inlet port 23 to one of the control ports 27 or 29, and then from the other of the control ports 27 or 29 to the return port 25, but with the parallel path being structurally separate and distinct from the main path, although still defined within the spool 35 and sleeve 37.

It is a further aspect of the present invention that the main (rotary) fluid path and the parallel (axial) fluid path be arranged such that either one may be actuated by itself, and operation of the parallel (axial) fluid path may be overridden by a rotary input to the controller. As was explained previously, the main fluid path typically includes the fluid meter 17, whereas it is a still further aspect of the present invention that the parallel fluid path exclude the fluid meter, as will be described in greater detail in connection with FIG. 9.

In connection with the subsequent description of the valving arrangement, and in the appended claims, many elements (such as ports, passages, and chambers) are referred to by means of the term "axial". It will be understood by those skilled in the art that such use of the term "axial" is not necessarily intended to denote a structural feature of the particular element, or a particular orientation, but instead, is intended to indicate that that particular element is related to the axial actuation of the sleeve 37, or is involved in defining the parallel (axial) fluid path.

Valving Arrangement

Referring now primarily to FIG. 7, the spool 35 and sleeve 37 will be described in greater detail, with regard to the various ports and passages defined by the spool and sleeve. In connection with the subsequent description, it should be noted that many of the ports and passages are arranged symmetrically, or generally symmetrically with respect to an imaginary central reference plane RP passing just to the left of the chamber 23c, and such elements will be described by a reference numeral followed by either an R or an L to indicate that the element is located on either the right side or the left side, respectively, of the central reference plane RP. On the other hand, certain of the elements do not have a corresponding element oppositively disposed about the reference plane RP, and will be referred to by use of a reference numeral alone.

Figure 8:
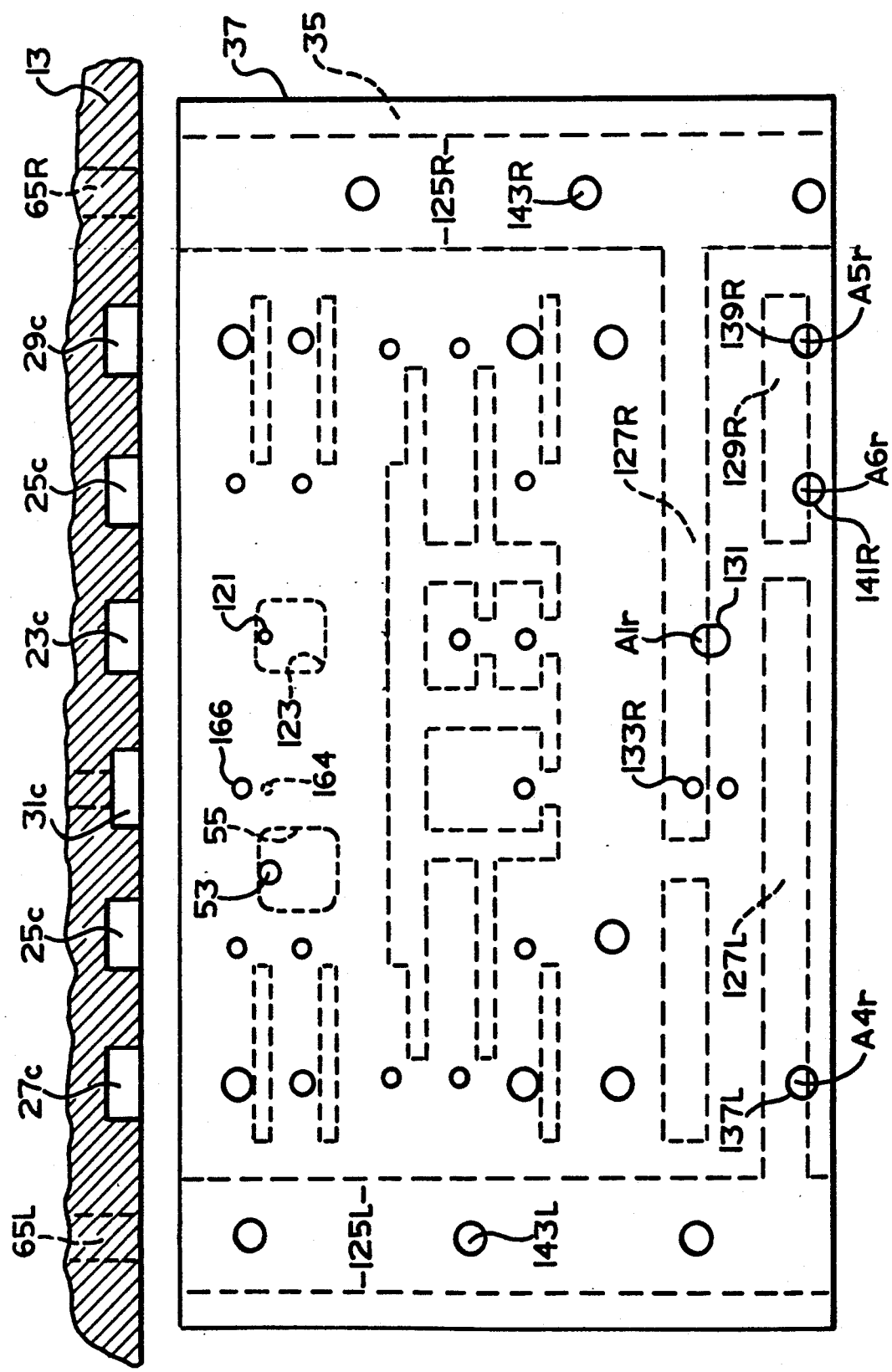
FIG. 8 is an overlay view, similar to FIG. 7, illustrating the rotary actuated position of the valving.

It should also be understood that the overlay views of FIGS. 7 through 11 are intended to illustrate primarily the interface between the spool 35 (dashed lines) and the sleeve 37 (solid lines), and as a result, certain structural features which appear only on the outer surface of the sleeve 37 will be shown only in FIG. 7, but will not be repeated in the subsequent spool-sleeve overlay views. In FIGS. 7 and 8, the spool 35 and sleeve 37 may appear to have the same axial length, but that is done only for ease of illustration, and it should be apparent from reviewing FIGS. 1, 2 and 5 that the sleeve 37 is necessarily somewhat shorter in the axial direction than is the spool 35.

Referring now only to FIG. 7, the spool 35 defines a pair of annular meter grooves 125L and 125R, which are axially aligned with the radial bores 65L and 65R, respectively. In communication with the meter groove 125L is a pressure passage 127L, and in communication with the meter groove 125R is a pressure passage 127R. Adjacent the end of the pressure passage 127L is a return passage 129R, and adjacent the end of the pressure passage 127R is a return passage 129L.

The sleeve 37 defines a pressure port 131, disposed generally adjacent the imaginary reference plane RP. Disposed to the of left the port 131 is a pair of load sensing ports 133L and 133R, both of which are in open communication with an annular load sensing groove 135, defined on the outer surface of the sleeve 37. The groove 135 is in continuous communication with the load signal port 31 by means of the annular chamber 31c and the passage 31p. The sleeve 37 further defines an operating port 137L disposed adjacent the pressure passage 127L, and an operating port 137R, disposed adjacent the pressure passage 127R. The sleeve 37 also defines an operating port 139L disposed adjacent the return passage 129L, and an operating port 139R disposed adjacent the return passage 129R. Also disposed adjacent the return passage 129L is a return port 141L, and also disposed adjacent the return passage 129R is a return port 141R. Finally, the sleeve 37 defines a plurality of meter ports 143L in continuous communication with the meter groove 125L, and a plurality of meter ports 143R, in continuous communication with the meter groove 125R. Each of the meter ports 143L and 143R includes a generally rectangular opening 145L or 145R, respectively, defined by the outer surface of the sleeve 37. The purpose of the openings 145L and 145R is to permit commutating fluid communication between the meter ports 143L and the radial bores 65L, and between the meter ports 143R and the radial bores 65R, even when the sleeve 37 has been axially displaced in either direction from the neutral axial position shown in FIG. 7.

All of the ports and passages described thus far in connection with FIG. 7 relate to the rotary actuation of the controller which, because such actuation is generally well-known in the art, will be described only briefly hereinafter. Referring now to FIG. 8, if the steering wheel and the spool 35 are rotated clockwise (the spool 35 moves "down" in FIG. 8), pressurized fluid flows from the inlet port 23 to the annular chamber 23c, then through the pressure port 131 which is now overlapping the pressure passage 127R to define a main variable flow control orifice (A1r), the designation "r" after "A1" merely indicating an orifice formed in response to relative rotational movement of the spool and sleeve. At the same time, the pressure in the passage 127R (downstream of the A1r orifice) is being "sensed" or communicated through the load sensing port 133R to the load signal port 31 as described previously. Fluid flowing through the A1r orifice then flows into the meter groove 125R, then through the meter ports 143R to the meter 17, returning from the meter 17 and through the meter ports 143L and into the meter groove 125L. This metered fluid then enters the pressure passage 127L which is now overlapped by the operating port 137L to define a variable flow control orifice (A4r). Metered fluid flows from the A4r orifice into the annular chamber 27c, and from there to the control port 27 and into the steering cylinder. Fluid returning from the exhaust side of the steering cylinder flows to the control port 29, then into the annular chamber 29c and into an A5r orifice defined by the overlap of the operating port 139R and the return passage 129R. This return fluid then flows through an A6r orifice defined by the overlap between the return passage 129R and the return port 141R. Flow through the A6r orifice then enters the annular chamber 25c (the one on the right side of the central reference plane RP), then flows to the return port 25 and to the system reservoir. The above-described flow path comprises the main fluid path defined when the spool and sleeve are displaced from the neutral rotary position to a rotary operating position. However, it should be noted that in both FIGS. 7 and 8, the spool and sleeve are still in a neutral axial position relative to each other. Note in FIG. 8 the shifted position of the pin 53 within the opening 55, and also the shifted position of the pilot passage 121 within the opening 123.

Axial Actuation-Right Turn

Referring again to FIG. 7, the various ports and passages defined by the spool and sleeve which are involved in defining a parallel fluid path, when the valve members are axially actuated, will now be described. The spool 35 defines a main, axially oriented passage 151, and in communication therewith, a pair of circumferentially oriented passages 153L and 153R. The passage 153L feeds a pair of pressure passages 155L, while the passage 153R feeds a pair of pressure passages 155R.

In communication with the main passage 151 is a pair of axially oriented passages 157L, and a pair of axially oriented passages 157R. In addition, the spool 35 defines three return passages 159L, and three return passages 159R.

The sleeve 37 defines a pair of pressure ports 161 which are in continuous fluid communication with the inlet port 23 through the annular chamber 23c, and a third pressure port 161 in continuous communication with the axially oriented passage 151. It should be understood that the overlay view of FIG. 7 comprises approximately 180° of the spool and sleeve, such that the arrangement shown in FIG. 7 is duplicated diametrically opposite, and the continuous communication of one port 161 with the passage 151 provides radial pressure balancing of the spool 35 relative to the sleeve 37. With the spool and sleeve in the neutral axial position of FIG. 7, the pressure ports 161 are preferably evenly spaced between the pressure passages 155L and 155R.

The sleeve 37 defines a load sensing port 163 which, in the neutral axial position, is evenly disposed between a pair of load sensing passages 165L and 165R. As is well known to those skilled in the art, when the spool and sleeve are in the neutral rotary and neutral axial position, it is necessary to drain the load sensing signal from the load sensing circuit, including the groove 135. In order to accomplish this, the spool is provided with a drilled hole 164 communicating with the interior chamber 73, and the sleeve is provided with a drilled hole 166 which communicates between the groove 135 and the hole 164. Whenever the spool and sleeve are in the neutral rotary and neutral axial position, the load sensing circuit is drained to the interior chamber 73, but as the spool and sleeve are displaced in either the rotary or axial position, communication between the holes 164 and 166 is discontinued, and load pressure begins to build in the groove 135, in the normal manner.

Disposed adjacent the ends of the passages 157L is a pair of operating ports 167L, and disposed adjacent the ends of the passages 157R is a pair of operating ports 169R. In continuous communication with each of the return passages 159L is an operating port 169L, and in continuous communication with each of the return passages 159R is an operating port 169R. Finally, the sleeve 37 defines a return port 171L disposed adjacent the end of each of the return passages 159L when the valve members are in the neutral axial position of FIG. 7, and at the same time, defines a return port 171R adjacent the end of each of the return passages 159R.

Figure 9:
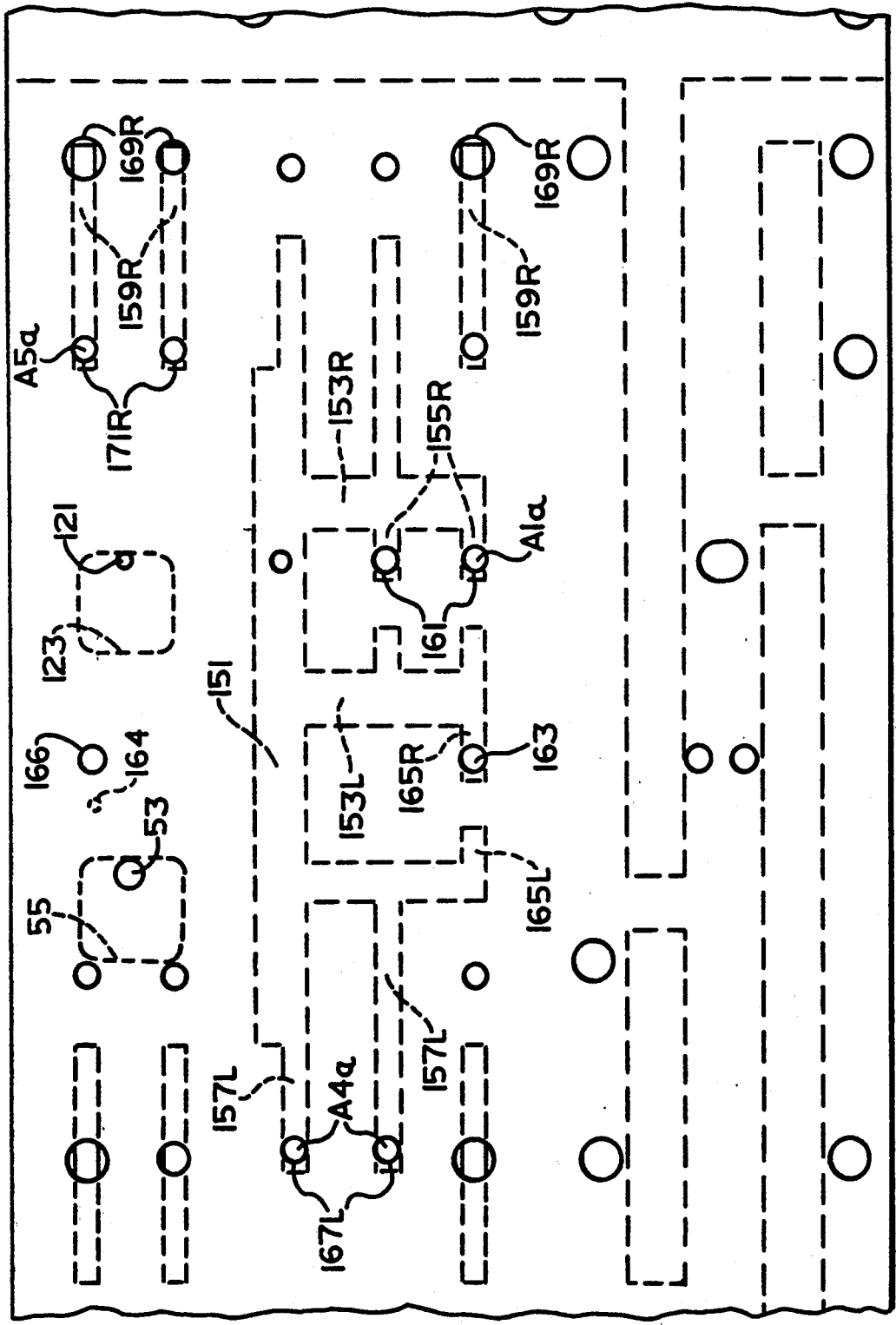
FIG. 9 is a fragmentary overlay view, similar to FIG. 7, but further enlarged relative to FIG. 7, illustrating the valving in the axial actuated position.

Referring now to FIG. 9, with the spool and sleeve in the neutral rotary position, the sleeve has been actuated axially to a position corresponding to the position of the sleeve shown in FIG. 5, i.e., shifted toward the right, relative to the spool. Note the shifted positions of the pin 53 and pilot passage 121 within the openings 55 and 123, respectively. In the axial operating position shown in FIG. 9, both of the pressure ports 161 are in communication with their respective pressure passages 155R, to define therebetween an A1a orifice, the designation "a" after the "A1" merely indicating an orifice formed in response to relative axial motion of the spool and sleeve. pressurized fluid from the inlet port flows into the main passage 151, and all the various spool passages in communication therewith. As may be seen in FIG. 9, the load sensing port 163 is now in communication with the load sensing passage 165R, such that the fluid pressure downstream of the A1a orifice is sensed and communicated back to the load signal port 31. At the same time, flow through the A1a orifice flows through the passages 157L which are now in communication with the operating ports 167L, to define a variable flow control orifice A4a. As is well known to those skilled in the art, the A4a "orifice" really comprises the cumulative orifice area defined by both of the operating ports 167L overlapping both of the passages 157L. Flow through the A4a orifice then flows to the annular chamber 27c, then to one end of the steering cylinder, and from the other end of the steering cylinder back to the annular chamber 29c, in the same manner as described in connection with the rotary actuation of the spool and sleeve.

Fluid returning from the steering cylinder through the annular chamber 29c flows through the operating ports 169R into the return passages 159R, each of which is now in communication with a return port 171R, the overlap therebetween defining a variable flow control orifice A5a. Return fluid then flows through the A5a orifice to the annular chamber 25c and to the return port 25. The above-described flow path comprises the parallel fluid path which results when the spool and sleeve are in an axial operating position. It should be noted in connection with the above description of the parallel fluid path that, unlike the main fluid path, the parallel fluid path does not flow through the fluid meter 17. Therefore, the fluid flowing through the parallel fluid path is not "metered", whereas the fluid flowing through the main fluid path described in connection with FIG. 8 is "metered" fluid. As is well-known to those skilled in the art, one of the reasons for metering the fluid flowing through the main fluid path is to provide a follow-up movement to the follow up valve member (i.e., the sleeve 37) to cause the follow-up valve member to "follow" the rotating primary valve member (i.e., the spool 35). In the case of axial actuation of the valve members, however, no such follow-up movement is required. Instead, it is anticipated that the controller of the present invention would be used in conjunction with an external closed-loop control system in which the axial actuation and parallel fluid path would be maintained only until an "error" signal would be reduced to zero, thus indicating no further need for parallel fluid flow, and returning the valve members to their neutral axial position. An example of a microprocessor driven control circuit, which would provide a suitable electrical signal 113 to the solenoid valve 95, is illustrated and described in copending application U.S. Ser. No. 302,889, now U.S. Pat. No. 4,967,362, for an AUTOMATIC STEERING APPARATUS FOR CROP VEHICLE, filed in the names of Herman P. Schutten; Dwight B. Stephenson; and Oliver W. Johnson, assigned to the assignee of the present invention, and incorporated herein by reference. Such a circuit is shown in greater detail in copending application U.S. Ser. No. 326,475, for a GUIDANCE APPARATUS FOR A VEHICLE, filed in the names of the same three inventors, assigned to the assignee of the present invention, and also incorporated herein by reference.

Referring again to FIG. 9, it may be seen that the axial actuation of the sleeve 37 has directed the flow of the parallel fluid path to the control port 27, thus initiating a right turn of the vehicle, the same as occurred in response to rotation of the steering wheel and spool 35 in a clockwise direction in FIG. 8.

Manual Override

It is contemplated in connection with the present invention that the axial actuation of the valve members will typically occur in response to the external electrical signal 113, and typically as part of an automatic guidance system on some sort of vehicle on which an operator is still present. It is one important aspect of the present invention for the operator to be able to manually override such an automatic guidance system in the event that, for example, the operator suddenly becomes aware of the need to deviate from the nominal vehicle path determined by the automatic guidance system. Therefore, referring now to FIG. 10, there is illustrated the relative position of the spool 35 and sleeve 37 after the operator has manually overridden the axial operating position shown in FIG. 9, in which the vehicle was in a right turn. In FIG. 9, the spool and sleeve are in the neutral rotary position, and all flow is through the parallel (axial) fluid path.

Figure 10:
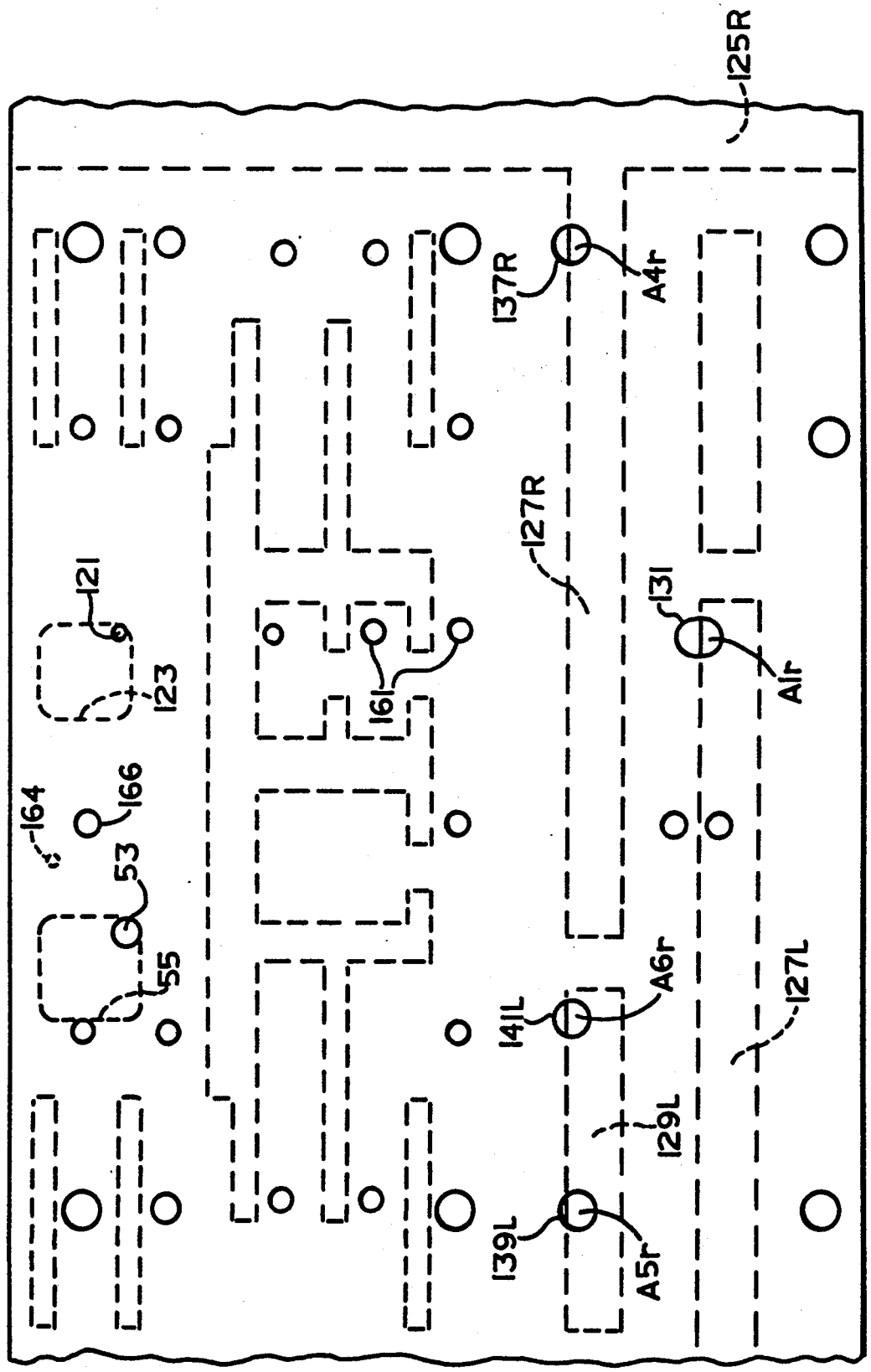
FIG. 10 is an overlay view, similar to FIG. 9, and on the same scale, illustrating the valving in an axial actuated position, being overridden by rotary input to steer in the opposition direction.

When the operator becomes aware of the need to deviate from the automatically selected right turn, the operator merely rotates the wheel and the spool 35 counterclockwise, in the direction of a normal left turn (causing the spool 35 to move "upward" in FIG. 10). The override maneuver by the operator has two effects. First, by comparing FIG. 10 with FIG. 9, it may be seen that all of the axial ports defined by the sleeve 37 are now out of communication with the various axial passages defined by the spool 35. Secondly, the operator has now moved the spool 35 to a rotary operating position corresponding to a left turn. In FIG. 10, pressurized fluid from the inlet port 23 now flows through the pressure port 131 into the pressure passage 127L to define a variable flow control orifice A1r, then into the meter groove 125L (not shown in FIG. 10), and then through the fluid meter 17. The metered fluid then flows into the meter groove 125R, then through the pressure passage 127R, which is now in fluid communication with the operating port 137R to define a variable flow control orifice A4r. The flow of metered fluid through the A4r orifice then flows to the annular chamber 29c, then to the control port 29, then to the steering cylinder, initiating a left turn. Fluid returning from the other end of the steering cylinder flows to the control port 27, then through the annular chamber 27c to the operating port 139L, which is now in fluid communication with the return passage 129L, to define a variable flow control orifice A5r. Flow through the A5r orifice then flows along the passage 129L and then through a variable flow control orifice A6r defined by the overlap of the return port 141L and the return passage 129L. Return flow through the A6r orifice then flows to the return port 25c in the manner described previously.

One of the major benefits of the manual override capability described above is that the vehicle operator retains the ability to manually steer the vehicle in the case of an emergency, such as the loss of hydraulic power. Even if the sleeve 37 has been actuated axially in one direction or the other, the vehicle operator would be able to rotate the steering wheel and manually steer the vehicle in either direction, without the parallel path interfering with the manual steering capability. As is well known to those skilled in the art, in order to manually steer the vehicle, it is necessary to have a manual steering check valve disposed between the inlet port 23 and the return port 25, so that fluid may be drawn from the reservoir, through the return port 25 and into the inlet port 23, thus being available for "hand pump" operation of the fluid meter 17.

Axial Actuation-Left Turn

Figure 11:
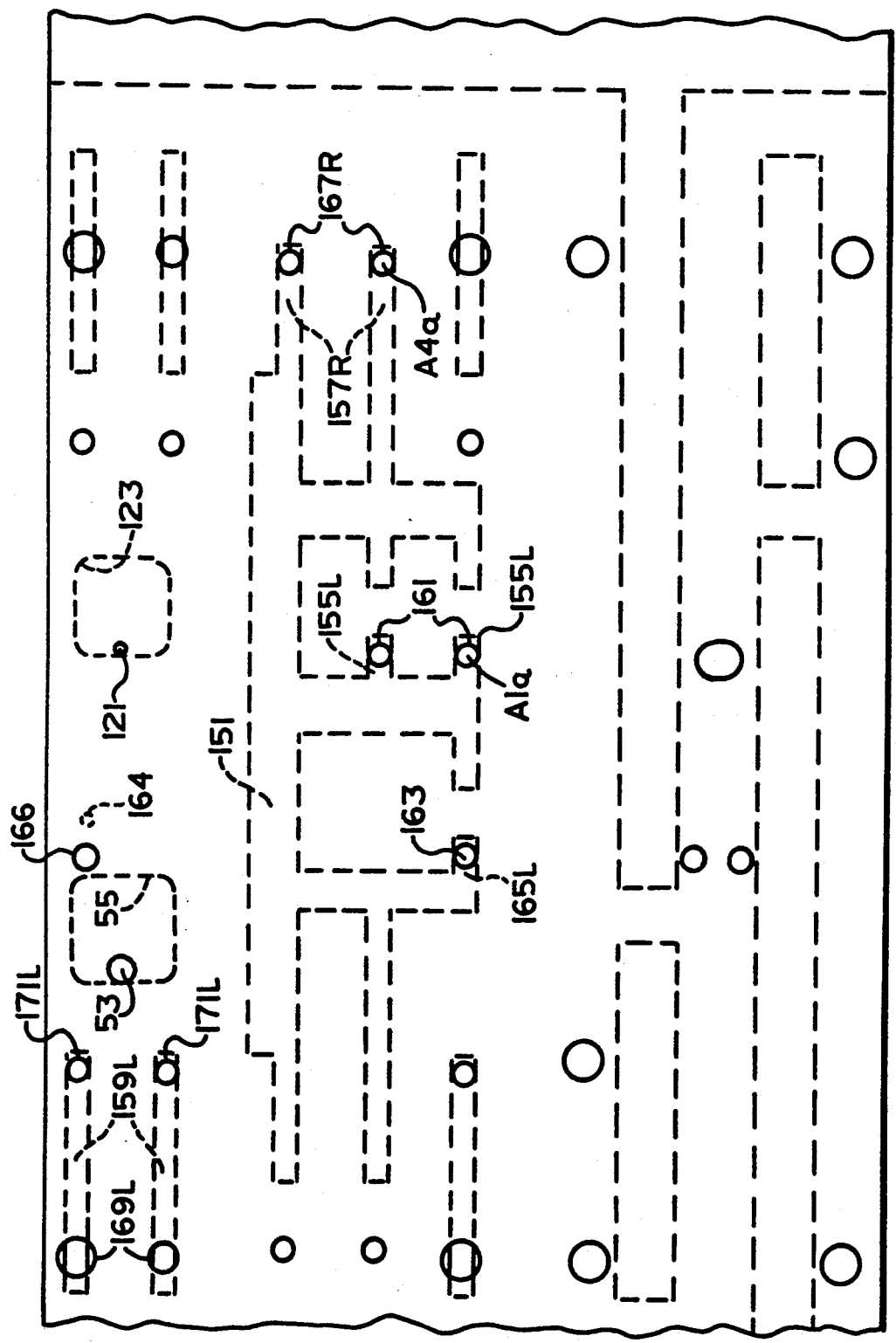
FIG. 11 is a fragmentary overlay view, similar to FIG. 9, but with the valving in the opposite axial actuated position from that shown in FIG. 9.

Referring now primarily to FIG. 11, there is illustrated axial actuation of the sleeve 37, but in a direction opposite that shown in FIG. 9. In other words, in FIG. 9, the sleeve 37 was moved to the position shown in FIG. 5, initiating a right turn of the vehicle. In FIG. 11, the sleeve has been moved to the position shown in FIG. 2, initiating a left turn of the vehicle.

In FIG. 11, the pressure ports 161 are now in communication with the respective pressure passages 155L, to define therebetween an A1a orifice. Pressurized fluid flows into the main passage 151, then flows to the right in FIG. 11 through the passages 157R which are now in communication with the operating ports 167R, to define a variable flow control orifice A4a. At the same time, the load sensing port 163 is now in communication with the load sensing passage 165L, such that fluid pressure downstream of the A1a orifice is communicated to the load signal port 31.

Flow through the A4a orifice then flows to the annular chamber 29c, then to one end of the steering cylinder, and from the other end, back to the annular chamber 27c, in the same manner as described in connection with the rotary actuation of FIG. 10.

Fluid returning from the steering cylinder through the annular chamber 27c flows into the operating ports 169L then into the return passages 159L, each of which is now in communication with a return port 171L, the overlap therebetween defining a variable flow control orifice A5a. Return fluid then flows through the A5a orifice to the annular chamber 25c (the one on the left side of the imaginary reference plane RP in FIG. 11) and then to the return port 25.

It may now be understood by one skilled in the art that an important aspect of the present invention is the layout of the various ports and passages defined by the sleeve and spool which facilitate axial actuation of the valve members, to define a parallel fluid path, wherein the parallel fluid path excludes the fluid meter 17. More specifically, the present invention provides a controller in which the meter ports 143L and 143R are disposed adjacent the left and right axial ends of the spool and sleeve, respectively, it being recognized that the meter ports 143L and 143R are involved only in the definition of the main (rotary) fluid path.

In prior art spool-sleeve valve arrangements, with the meter ports being located axially between the pressure ports (such as 161) and the operating ports (such as 169L and 169R), it would not have been feasible to axially actuate the valve members, to define a parallel fluid path, wherein the parallel fluid path would have excluded the fluid meter. The amount of relative rotation between the spool and sleeve, and the number of meter ports 143R and 143L limit the ability to interrupt the annular meter grooves 125R and 125L, if they are located closer to the central reference plane RP, rather than being located at the opposite axially ends of the spool.

It is another important aspect of the present invention that the various ports and passages defined by the sleeve and spool are arranged in a generally symmetrical pattern relative to the imaginary central reference plane RP. The general concept of such symmetry in the ports and passages of a controller was first described and illustrated in above-incorporated U.S. Pat. No. 4,033,377, and in general, the benefits to be derived from the symmetrical arrangement shown herein are the same as the benefits described in U.S. Pat. No. 4,033,377.

In FIGS. 7 through 11, the spool and sleeve of the present invention have been illustrated and described in connection with a load sensing embodiment. As will be readily understood by one skilled in the art, if it is desired to apply the invention in a steering system requiring a closed center controller, no overall change of architecture of the spool and sleeve would be needed. Instead, it would be necessary merely to eliminate the load sensing port 31, as well as the passage 31p and the annular chamber 31c from the housing 13. The load sensing groove 135 and the load sensing ports 133L, 133R, and 163 would be eliminated from the sleeve 37, and the load sensing passages 165L and 165R would be eliminated from the spool 35.

Figure 12:
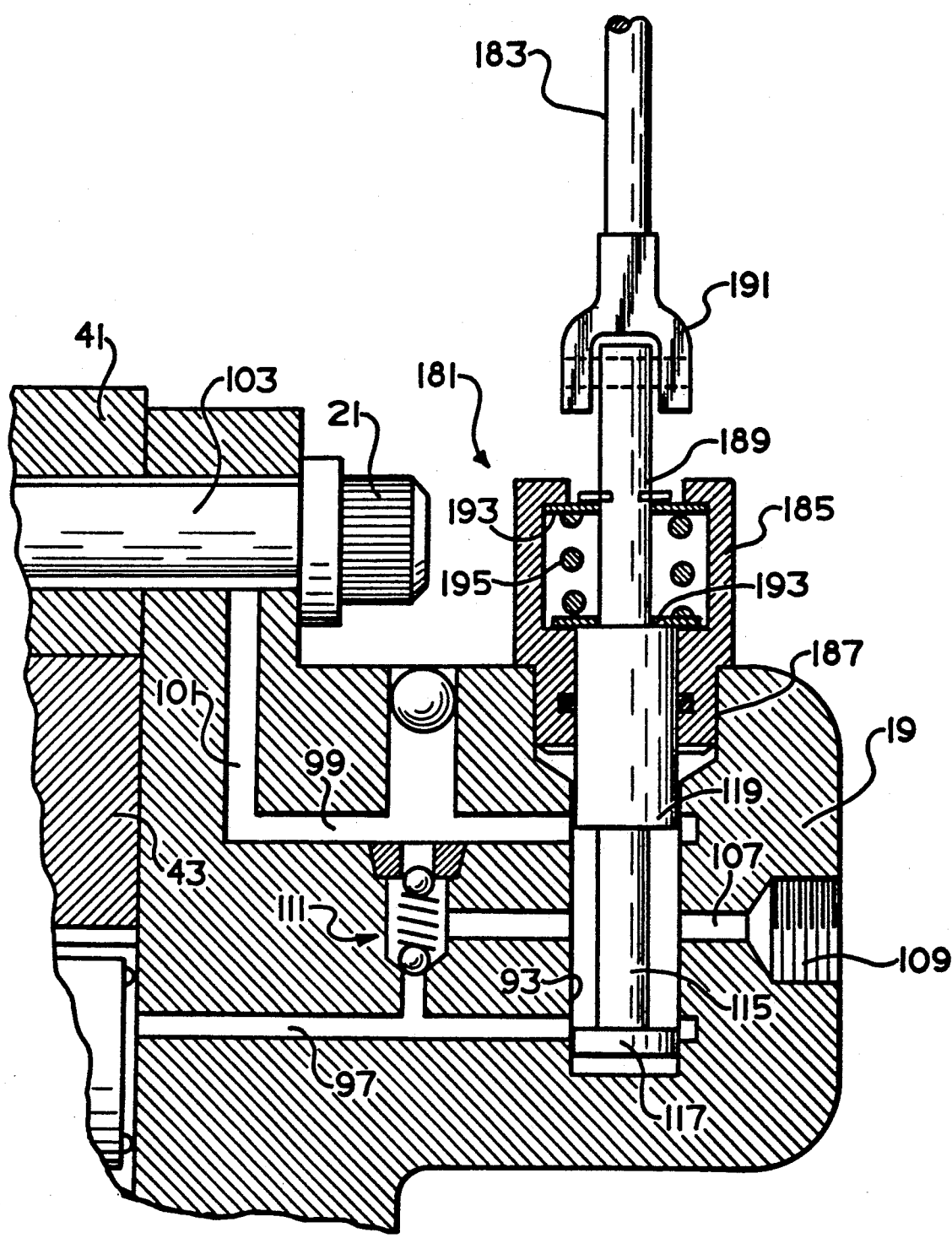
FIG. 12 is an axial cross-section, similar to FIG. 6, but further enlarged relative to FIG. 6, illustrating an alternative embodiment in which the axial position of the sleeve valve is controlled by a hydromechanical valve.

Referring now to FIG. 12, there is illustrated an alternative embodiment of the present invention in which the electrohydraulic controls of FIG. 6 are replaced by a hydromechanical control, generally designated 181.

In FIG. 12, those elements which are the same or substantially the same as in FIG. 6 bear the same reference numeral, and new elements bear reference numerals in excess of 181.

The control 181 is actuated in response to movement of a push-pull cable 183 of the type generally well known in the art of mechanical controls. The control 181 includes a casing portion 185, including an externally-threaded portion 187 which is threaded into the largest portion of the bore 93. Disposed within the casing 185 is a modified form of the valve member 115, which still defines valve lands 117 and 119, but also includes a flattened control portion 189, extending out of the casing 185. The control portion 189 is adapted to be attached to a yoke 191 on the end of the push-pull cable 183.

Disposed within the casing 185 is a pair of washers 193, and disposed between the washers 193 is a centering spring 195, the function of which is to constantly bias the valve member 115 toward the centered position shown in FIG. 12. Movement of the cable axially (either upward or downward in FIG. 12) will move the valve member 115 toward one of its actuated positions, in opposition to the force of the centering spring 195. As an example of a vehicle application for such a hydromechanical control, on many vehicles it is desired to perform a number of the control functions by means of foot pedals. One or more foot pedals could be connected to the push-pull cable 183 of the control 181, to enable the operator to steer by means of the pedals, while leaving the operator's hands free to operate various other implement controls.

It should also be apparent to those skilled in the art that the valve member 115 could be controlled by a remote hydraulic signal, with the parallel (axial) control perhaps being performed as a function of some other vehicle hydraulic circuit condition. Therefore, it should be understood that, as used hereinafter in the appended claims, the term "hydromechanical" in reference to the control of the valve member 115 is intended to include such hydraulic pressure control, as well as the direct mechanical control illustrated in FIG. 12.

The invention has been described in great detail in the foregoing specification, and it is believed that various alterations and modifications of the invention will become apparent to those skilled in the art from a reading and understanding of the specification. It is intended that all such alterations and modifications are included as part of the invention, insofar as they come within the scope of the appended claims.

I claim:

1. A controller operable to control the flow of fluid from a source of pressurized fluid to a fluid pressure operated device; said controller being of the type including housing means defining an inlet port for connection to the source of pressurized fluid, a return port for connection to a reservoir, and first and second control fluid ports for connection to the fluid pressure operated device; valve means disposed in said housing means, and comprising a primary, rotatable valve member and a cooperating, relatively rotatable follow-up valve member, said primary and follow-up valve members defining a neutral rotary position and a first rotary operating position in which said primary valve member is rotatably displaced from said neutral rotary position, relative to said follow-up valve member; said primary valve member defining first and second fluid passages, and said follow-up valve member defining a first fluid port in continuous fluid communication with said inlet port, and a second fluid port in continuous fluid communication with said first control fluid port; said first fluid port being blocked from fluid communication with said first fluid passage, and said second fluid port being blocked from fluid communication with said second fluid passage when said valve members are in said neutral rotary position; said first fluid port being in fluid communication with said first fluid passage, to define a first variable flow control orifice, and said second fluid port being in fluid communication with said second fluid passage, to define a second variable flow control orifice when said valve members are in said first rotary operating position; said housing means and said valve members cooperating to define a first main fluid path providing fluid communication between said first and second variable flow control orifices when said valve members are in said first rotary operating position; characterized by:

(a) said primary and follow-up valve members defining a neutral axial position and a first axial operating position;

(b) said controller including means operable to bias said valve members toward said neutral axial position, and means operable to displace said valve members to said first axial operating position;

(c) said primary valve member defining first and second axial fluid passages, and said follow-up valve member defining a first axial fluid port in continuous fluid communication with said inlet port, and a second axial fluid port in continuous fluid communication with said first control fluid port;

(d) said first axial fluid port being blocked from fluid communication with said first axial fluid passage, and said second axial fluid port being blocked from fluid communication with said second axial fluid passage when said valve members are in said neutral axial position; and (e) said first axial fluid port being in fluid communication with said first axial fluid passage to define a first variable axial flow control orifice, and said second axial fluid port being in fluid communication with said second axial fluid passage to define a second variable axial flow control orifice when said valve members are in said first axial operating position, said valve members cooperating to define a first parallel fluid path providing fluid communication between said first and second variable axial flow control orifices when said valve members are in said first axial operating position.

2. A controller as claimed in claim 1 characterized by said primary valve member defining a third fluid passage, and said follow-up valve member defining a third fluid port in continuous fluid communication with said second control fluid port, and a fourth fluid port in continuous fluid communication with said return port; said third and fourth fluid ports being blocked from fluid communication with said third fluid passage when said valves members are in said neutral rotary position; said third and fourth fluid ports being in fluid communication with said third fluid passage, to define at least a third variable flow control orifice, when said valve members are in said first rotary operating position.

3. A controller as claimed in claim 2 characterized by said primary valve member defining a third axial fluid passage, and said follow-up valve member defining a third axial fluid port in continuous fluid communication with said second control fluid port, and a fourth axial fluid port in continuous fluid communication with said return port; at least one of said third and fourth axial fluid ports being blocked from fluid communication with said third axial fluid passage when said valve members are in said neutral axial position; and both said third and fourth axial fluid ports being in fluid communication with said third axial passage, to define a third variable axial flow control orifice, when said valve members are in said first axial operating position.

4. A controller as claimed in claim 1 characterized by said first and second axial fluid passages being configured such that, when said valve members are moved from said neutral rotary and said first axial operating position to a rotary operating position, said first axial fluid port becomes blocked from fluid communication with said first axial fluid passage and said second axial fluid port becomes blocked from fluid communication with said second axial fluid passage.

5. A controller as claimed in claim 1 characterized by said housing means defining a load sensing fluid port, and said follow-up valve member defining a load sensing passage in continuous fluid communication with said load sensing fluid port, said load sensing passage being blocked from fluid communication with said first fluid passage when said valve members are in said neutral rotary position, said load sensing passage being in fluid communication with said first fluid passage when said valve members are in said first rotary operating position.

6. A controller as claimed in claim 5 characterized by said follow-up valve member defining an axial load sensing passage in continuous fluid communication with said load sensing fluid port, said axial load sensing passage being blocked from fluid communication with said first axial fluid passage when said valve members are in said neutral axial position, said axial load sensing passage being in fluid communication with said first axial fluid passage when said valve members are in said first axial operating position.

7. A controller as claimed in claim 1 characterized by said primary and follow-up valve members defining a second rotary operating position in which said primary valve member is rotatably displaced relative to said follow-up valve member in a direction opposite that of said first rotary operating position; said valve members, in said second rotary operating position, providing fluid communication on said first fluid port to said second control fluid port and from said first control fluid port to said return fluid port.

8. A controller as claimed in claim 7 characterized by said first and second axial fluid ports and said first and second axial fluid passages being configured such that when said valve members are moved from said neutral rotary position and said first axial operating position to said second rotary operating position, said first axial fluid port becomes blocked from fluid communication with said first axial fluid passage and said second axial fluid port becomes blocked from fluid communication with said second axial fluid passage.

9. A controller as claimed in claim 1 characterized by:

(a) said primary and follow-up valve members defining a second axial operating position;

(b) said controller including means operable to displace said valve members to said second axial operating position;

(c) said primary valve member defining fourth and fifth axial fluid passages, and said follow-up valve member defining a fifth axial fluid port in continuous fluid communication with said second control fluid port;

(d) said first axial fluid port being blocked from fluid communication with said fourth axial fluid passage, and said fifth axial fluid port being blocked from fluid communication with said fifth axial fluid passage when said valve members are in said neutral axial position; and (e) said first axial fluid port being in fluid communication with said fourth axial fluid passage to define a variable axial flow control orifice, and said fifth axial fluid port being in fluid communication with said fifth axial fluid passage to define a variable axial flow control orifice when said valve members are in said second axial operating position, said valve members cooperating to define a second parallel fluid path providing fluid communication between said variable axial flow control orifices when said valve members are in said second axial operating position.

10. A controller as claimed in claim 1 characterized by fluid actuated means for imparting follow-up movement to said follow-up valve member proportional to the volume of fluid flow through said first main fluid path when said valve members are in said first rotary operating position.

11. A controller as claimed in claim 10 characterized by said primary valve member defining first and second meter grooves, and said follow-up valve member defining first and second sets of meter ports, in continuous fluid communication with said first and second meter grooves, respectively; said housing means defining first and second meter passage means in continuous fluid communication with expanding and contracting fluid volume chambers, respectively, defined by said fluid actuated means, and first and second sets of meter ports being in commutating fluid communication with said first and second meter passage means, respectively, in response to fluid flow through said first main fluid path and rotation of said follow-up valve member.

12. A controller as claimed in claim 1 characterized by said primary and follow-up valve members cooperating with said housing means to define first and second axial chambers, and further characterized by said first and second axial chambers including said means operable to bias said valve members toward said neutral axial position.

13. A controller as claimed in claim 12 characterized by electrohydraulic control means operable, in response to an external electrical signal to control the fluid pressures in said first and second axial chambers, said electrohydraulic control means being operable between one condition in which the fluid pressures in said first and second axial chambers are approximately equal, and said valve members are biased toward said neutral axial position, and another condition in which the fluid pressure in said first axial chamber is greater than the fluid pressure in said second axial chamber, and said valve members are displaced to said first axial operating position.

14. A controller as claimed in claim 12 characterized by hydromechanical control means operable, in response to an external mechanical input to control the fluid pressures in said first and second axial chambers, said hydromechancial control means being operable between one position in which the fluid pressures in said first and second axial chambers are approximately equal, and said valve members are biased toward said neutral axial position, and another condition in which the fluid pressure in one of said first and second axial chambers is greater than the fluid pressure in the other of said first and second axial chambers, and said valve members are displaced to one of said axial operating positions.

15. A controller operable to control the flow of fluid from a source of pressurized fluid to a fluid pressure operated device; said controller being of the type including housing means defining an inlet port for connection to the source of pressurized fluid, a return port for connection to a reservoir, and first and second control fluid ports for connection to the fluid pressure operated device; valve means disposed in said housing means, and comprising a primary, rotatable valve member and a cooperating, relatively rotatable follow-up valve member, said primary and follow-up valve members defining a neutral rotary position and a first rotary operating position in which said primary valve member is rotatably displaced from said neutral position, relative to said follow-up valve member; fluid actuated means for imparting follow-up movement to said follow-up valve member proportional to the volume of fluid flow through said fluid actuated means; said housing means and said primary and follow-up valve members cooperating to define a first main fluid path providing fluid communication from said inlet port to said first control fluid port and from said second control fluid port to said return port when said valve members are in said first rotary operating position, said first main fluid path including said fluid actuated means; characterized by:

(a) said primary and follow-up valve members defining a neutral axial position and a first axial operating position;

(b) said controller including means operable to bias said valve members toward said neutral axial position, and means operable to displace said valve members to said first axial operating position;

(c) said housing means and said primary and follow-up valve members cooperating to define a first parallel fluid path providing fluid communication from said inlet port to said first control fluid port and from said second control fluid port to said return port when said valve members are in said first axial operating position, said first parallel path excluding said fluid actuated means.

16. A controller as claimed in claim 15 characterized by said first parallel fluid path being configured such that, when said valve members are displaced from said neutral rotary and first axial operating position to a rotary operating position, fluid communication through said first parallel fluid path becomes blocked, and fluid communication occurs only through said main fluid path.

17. A controller as claimed in claim 15, characterized by said follow-up valve member cooperating with said housing means to define first and second axial chambers, disposed on the axially opposite ends of said follow-up valve member.

18. A controller as claimed in claim 17 characterized by said first and second axial chambers including, respectively, first and second means for biasing said follow-up valve member toward said neutral axial position.

19. A controller as claimed in claim 15 characterized by said means operable to displace said valve members to said first axial operating position comprising electrohydraulic control means, said housing means and said follow-up valve member cooperating to define at least a first axial chamber, said electrohydraulic control means being operable, in response to an external electrical signal, to control the fluid pressure in said first axial chamber.

20. A controller as claimed in claim 19 characterized by said primary valve member comprising a generally cylindrical, hollow member defining an interior chamber; said primary and follow-up valve members cooperating to define a first pilot passage means operable to provide fluid communication from one of said fluid inlet port and said fluid return port to said interior chamber of said primary valve member; said primary valve member defining a second pilot passage means providing fluid communication between said interior chamber and said first axial chamber.

21. A controller as claimed in claim 20 characterized by said housing means defining a bore adapted to receive said electrohydraulic control means, and further defining a third pilot passage means disposed to provide fluid communication between said interior chamber and said bore.

22. A controller as claimed in claim 21 characterized by said electrohydraulic control means comprising a pilot valve member disposed in said bore, said pilot valve member being movable between one position in which said pilot valve member permits fluid communication from said third pilot passage means to a source of relatively low pressure fluid, and another position in which said pilot valve member substantially blocks fluid communication from said third pilot passage means to said source of relatively low pressure fluid.

23. A controller as claimed in claim 19 characterized by said housing means and said follow-up valve member cooperating to define a second axial chamber, said electrohydraulic control means being operable, in response to an external electrical signal to control the fluid pressure in said second axial chamber.

24. A controller as claimed in claim 23 characterized by said housing means defining pilot passage means disposed to provide fluid communication from one of said fluid inlet port and said fluid return port to said second axial chamber, and from said second axial chamber to said electrohydraulic control means.

25. A controller as claimed in claim 24 characterized by said electrohydraulic control means comprising a pilot valve member, and said housing means defining a bore, said pilot valve member being disposed in said bore and being movable between one position in which said pilot valve member permits fluid communication from said pilot passage means to a source of relatively low pressure fluid, and another position in which said pilot valve member substantially blocks fluid communication from said pilot passage means to said source of relatively low pressure fluid.

26. A controller as claimed in claim 15 characterized by said means operable to displace said valve members to said first axial operating position comprising hydromechanical control means, said housing means and said follow-up valve member cooperating to define at least a first axial chamber, said hydromechanical control means being operable, in response to an external mechanical input to control the fluid pressure in said first axial chamber.

27. A controller operable to control the flow of fluid from a source of pressurized fluid to a fluid pressure operated device; said controller being of the type including housing means defining an inlet port for connection to the source of pressurized fluid, a return port for connection to a reservoir, and first and second control fluid ports for connection to the fluid pressure operated device; valve means disposed in said housing means, and comprising a primary, rotatable valve member and a cooperating, relatively rotatable follow-up valve member, said primary and follow-up valve members defining a neutral rotary position and a first rotary operating position in which said primary valve member is rotatably displaced from said neutral position, relative to said follow-up valve member; fluid actuated means for imparting follow-up movement to said follow-up valve member proportional to the volume of fluid flow through said fluid actuated means; said follow-up valve member defining a first fluid port in continuous fluid communication with said inlet port, said first fluid port being disposed approximately centered between the axially opposite ends of said follow-up valve member; said follow-up valve member further defining a first set of meter ports in commutating fluid communication with said fluid actuated means; and a second set of meter ports in commutating fluid communication with said fluid actuated means; said primary valve member defining first, second and third fluid passages, and said follow-up valve member defining second and third fluid ports, in continuous fluid communication with said first and second control fluid ports, respectively; said first, second and third fluid ports being blocked from fluid communication with said first, second and third fluid passages, respectively, when said valve members are in said neutral rotary position; said first fluid port being in fluid communication with said first fluid passage, to define a first variable flow control orifice, said second fluid port being in fluid communication with said second fluid passage, to define a second variable flow control orifice, and said third fluid port being in fluid communication with said third fluid passage, to define a third variable flow control orifice, when said valve members are in said first rotary operating position; characterized by:
 (a) said first set of meter ports being disposed adjacent the first axial end of said follow-up valve member;
 (b) said second set of meter ports being disposed adjacent the second axial end of said follow-up valve member;
 (c) said second fluid port being disposed axially between said first fluid port and said second set of meter ports; and
 (d) said third fluid port being disposed axially between said first fluid port and said first set of meter ports.

28. A controller as claimed in claim 27 characterized by:
 (a) said primary and follow-up valve members defining a neutral axial position and a first axial operating position;
 (b) said controller including means operable to bias said valve members toward said neutral axial position, and means operable to displace said valve members to said first axial operating position;
 (c) said follow-up valve member defining a first axial fluid port in continuous communication with said inlet port and a second axial fluid port in continuous fluid communication with said first control fluid port;

(d) said first axial fluid port being disposed approximately centered between the axially opposite ends of said follow-up valve member; and (e) said second axial fluid port being axially disposed between said first axial fluid port and said second set of meter ports, said primary valve member defining one axial fluid passage means operable to provide fluid communication from said first axial fluid port to said second axial fluid port when said valve members are in said first axial operating position.

29. A controller as claimed in claim 28 characterized by:

(a) said follow-up valve member defining third and fourth axial fluid ports in continuous fluid communication with said second control fluid port and said return fluid port, respectively;

(b) said third and fourth axial fluid ports being axially disposed between said first axial fluid port and set first set of meter ports; and (c) said primary valve member defining another fluid passage means operable to provide fluid communication from said third axial fluid port to said fourth axial fluid port when said valve members are in said first axial operating position.

30. A controller as claimed in claim 29 characterized by:

(a) said primary and follow-up valve members cooperating to define a second axial operating position;

(b) said controller including means operable to displace said valve members toward said second axial operating position;

(c) said primary valve member defining fourth and fifth axial fluid passages, and said follow-up valve member defining a fifth axial fluid port in continuous fluid communication with said second control fluid port;

(d) said first axial fluid port being in fluid communication with said fourth axial fluid passage to define a variable axial flow control orifice, and said fifth axial fluid port being in fluid communication with said fifth axial fluid passage to define a variable axial flow control orifice when said valve members are in said second axial operating position, said valve members cooperating to define axial fluid passage means providing fluid communication between said one and said another variable axial flow control orifices when said valve members are in said second axial operating position.

31. A controller as claimed in claim 27 characterized by said housing means defining a load sensing fluid port, and said follow-up valve member defining a load sensing passage in continuous fluid communication with said load sensing fluid port, said load sensing passage being in fluid communication with said first fluid passage when said valve members are in said first rotary operating position, said load sensing passage being disposed axially between said first fluid port and one of said second and third fluid ports.

32. A controller operable to control the flow of fluid from a source of pressurized fluid to a fluid pressure operated device; said controller being of the type including housing means defining an inlet port for connection to the source of pressurized fluid, a return port for connection to a reservoir, and first and second control fluid ports for connection to the fluid pressure operated device; valve means disposed in said housing means, and comprising a primary, rotatable valve member and a cooperating, relatively rotatable follow-up valve member, said primary and follow-up valve members defining a neutral rotary position and first and second rotary operating positions in which said primary valve member is rotatably displaced from said neutral position, relative to said follow-up valve member; fluid actuated means for imparting follow-up movement to said follow-up valve member proportional to the volume of fluid flow through said fluid actuated means; said fluid actuated means including a rotor member having rotational motion in response to the flow of fluid through said fluid actuated means, and further including a shaft member operable to transmit said rotational motion of said rotor member and a drive member operably associated with said shaft member and extending radially through an opening defined by said primary valve member and being in engagement with said follow-up valve member and operable to transmit said rotational motion of said shaft member to said follow-up valve member, said opening being circumferentially elongated relative to said drive member to permit relative rotational displacement of said valve members from said neutral rotary position to said first and second rotary operating positions; characterized by:

(a) said opening being axially elongated relative to said drive member to permit relative axial displacement of said valve members from a neutral axial position to either of a first or a second axial operating position.

33. A controller as claimed in claim 32 characterized by said housing means and said primary and follow-up valve members cooperating to define at least a first axial chamber, said controller including means operable to control the fluid pressure in said first axial chamber in response to an external electrical signal.

34. A controller as claimed in claim 33 characterized by said primary valve member comprising a generally cylindrical, hollow member defining an interior chamber, said primary and follow-up valve members cooperating to define a first pilot passage means operable to provide fluid communication between a source of pilot pressure and said interior chamber; said primary valve member defining a second pilot passage means providing fluid communication between said interior chamber and said first axial chamber.

35. A controller as claimed in claim 34 characterized by said first pilot passage means comprising a pilot passage defined by said follow-up valve member and a pilot opening defined by said primary valve member, said pilot passage providing fluid communication between said source of pilot pressure and said interior chamber through said pilot opening.

36. A controller as claimed in claim 35 characterized by said pilot opening being circumferentially elongated relative to said pilot passage to permit said relative rotational motion of said valve members, and being axially elongated relative to said pilot passage to permit said relative axial displacement of said valve members, without blocking communication of pilot pressure from said source to said interior chamber.

* * * * *